United States Patent [19]

Schwab

[11] Patent Number: 4,712,108

[45] Date of Patent: Dec. 8, 1987

[54] METHOD AND APPARATUS FOR DETECTING MICROBURSTS

[75] Inventor: Carl Schwab, Huntington Station, N.Y.

[73] Assignee: ISC Cardion Electronics, Inc., Woodbury, N.Y.

[21] Appl. No.: 789,971

[22] Filed: Oct. 21, 1985

[51] Int. Cl.[4] .......................................... G01S 13/95
[52] U.S. Cl. ........................................ 342/26; 73/189
[58] Field of Search ...................... 343/5 W; 342/26

[56] References Cited

U.S. PATENT DOCUMENTS

| | | | |
|---|---|---|---|
| 3,573,824 | 4/1971 | Armstrong et al. | 342/26 |
| 3,984,685 | 10/1976 | Fletcher et al. | 250/339 |
| 4,015,257 | 3/1977 | Fetter | 343/5 W |
| 4,043,194 | 8/1977 | Tanner | 73/178 T |
| 4,223,309 | 9/1980 | Payne | 343/5 W |
| 4,336,606 | 6/1982 | Heard | 73/189 X |
| 4,351,188 | 9/1982 | Fukushima | 342/26 X |
| 4,370,652 | 1/1983 | Lucchi | 343/5 SM |
| 4,516,125 | 5/1985 | Schwab | 343/7.7 |
| 4,589,070 | 5/1986 | Kyrazis | 364/424 |
| 4,649,388 | 3/1987 | Atlas | 342/26 |

OTHER PUBLICATIONS

Doviak et al, Doppler Weather Radar, Proceedings of the IEEE, vol. 67, No. 11, Nov. 1979, pp. 1522-1553.
Lee et al, Gust Front Wind Shear and Turbulence-Cuncurrent Aircraft and Surface Based Observations, 7th Conference on Aerospace, Aeronautical, Meteorological Symposium on Remote Sensing from Satellites, Melbourne, Fl., 1976.
Extracts-"The Impact of Weather on Aviation Safety", Report of the Subcommittee on Investigations and Oversight, U.S. House of Representatives, Nov. 1984 (pp. 8-11).
Chadwick et al, "Measurements Showing the Feasibility for Radar Detection of Hazardous Wind Shear at Airports", DTIC Technical Report No. AFGL-TR-78-0160, Jun. 1978.
Offi, "Wake Vortex Detection with Pulsed-Doppler Radar ASR-8 Feasibility Tests", FAA Technical Center Letter Report, Feb. 1982.
Campbell et al, "Low Elevation Angle Wind Measurements by FM-CW Radar", NOAA/ERL/Wave Propagation Laboratory, Boulder, Colo., pp. 722-726.
Extracts-Skolnik, Introduction to Radar Systems, McGraw-Hill Book Co., New York, 1962 (pp. 579-585).
"Wind Shear Microbursts Focus on Weather Study", Aviation Week & Space Technology, Jun. 14, 1982, pp. 41 & 43.
"Wind-Alert System OKd for 34 Airports"; Daily News, Oct. 12, 1979.

(List continued on next page.)

Primary Examiner—T. H. Tubbesing
Attorney, Agent, or Firm—Pollock, Vande Sande & Priddy

[57] ABSTRACT

The invention provides a method and apparatus for detecting specialized meteorological conditions, in particular a microburst. The detector is localized so as to process radar return signals from regions in which aircraft are particularly vulnerable to microbursts. The detector includes a Doppler radar and an intelligent processor. Doppler radar returns are stored in an array wherein the contents of each cell identify the wind velocity parallel to propagation path. A pattern matching process identifies the existence of a microburst, maximum wind velocity associated with the microburst, and the location of the center. By tracking the microburst center as a function of time, the microburst velocity and direction can be determined, allowing prediction for microburst location in the future. Based on observed microburst lifetimes, the expected duration of the microburst can also be predicted. Although the apparatus of the invention can be configured as a stand alone or dedicated unit, it can also be configured as an add-on to an existing ASDE-3.

17 Claims, 12 Drawing Figures

OTHER PUBLICATIONS

"Heavy Rain Danger Called Greater Than Wind Shear", Aviation Week & Space Technology, Jan. 26, 1981, pp. 50–51.

"NTSB Hearing on 727 Crash Expected to Focus on Weather", Aviation Week & Space Technology, Aug. 2, 1982, pp. 32.

North, "Weather Conditions Draw Focus in Pan Am Crash", Aviation Week & Space Technology, Jul. 19, 1982, pp. 19 & 33.

"The Wind-Shear Factor", Newsweek, Jul. 26, 1982, p. 25.

Bedard, Jr. et al, "The Dulles Airport Pressure Jump Detector Array for Gust Front Detection", Bulletin American Meteorological Society, vol. 58, No. 9, Sep. 1977, pp. 920–926.

Hardesty et al, "The Dulles Airport Acoustic-Microwave Radar Wind and Wind Shear Measuring System", Bulletin American Meteorological Society, vol. 58, No. 9, Sep. 1977, pp. 910–918.

Wilson et al, "Operational Application of Meteorological Doppler Radar", Bulletin American Meteorological Society, vol. 61, No. 10, Oct. 1980, pp. 1154–1168.

Fujita et al, "An Analysis of Three Weather-Related Aircraft Accidents", Bulletin American Meteorological Society, vol. 58, No. 11, Nov. 1977, pp. 1164–1181.

Sanderson, "Understanding Aeolus", Cruising World, Aug. 1982, pp. 32–35.

METHOD AND APPARATUS FOR DETECTING MICROBURSTS

TECHNICAL FIELD

The present invention relates to a method and apparatus for detecting specialized meteorological conditions, especially in the vicinity of airports, and more particularly is related to the detection of microbursts.

BACKGROUND ART

A report of the Subcommittee on Investigations and Oversight of the Committee on Public Works and Transportation, a committee of the U.S. House of Representatives entitled "The Impact of Weather on Aviation Safety", November 1984, indicates that research relative to the meteorological phenomena identified as a microburst began in 1976 following a June 1975 Eastern Airlines crash at JFK Airport. The microburst is defined as a powerful downward blast of air usually associated with a thunderstorm or rain, followed by a violent horizontal burst of air in all directions, or, wind shear. Microbursts are characterized as relatively small, two and a half miles in diameter or less, shortlived, 95% of microbursts reach maximum intensity in ten minutes and are difficult to detect with existing technology. Notwithstanding the research reportedly begun in 1976, the report, some 8 years later, recognized the need for an improvement in low level wind shear alert systems.

A number of techniques have been advanced for detection of wind shear, see Tanner U.S. Pat. No. 4,043,194 and Fletcher et al U.S. Pat. No. 3,984,685. Radar has been applied to this problem, see Fetter U.S. Pat. No. 4,015,257; Payne U.S. Pat. No. 4,223,309; Lucchi U.S. Pat. No. 4,370,652 and "Measurements Showing the Feasibility for Radar Detection of Hazardous Wind Shear at Airports" by Chadwick et al, a report provided to the National Oceanic and Atmospheric Administration and available under NTIS Accession No. AD A061 596.

Notwithstanding these efforts, insofar as I am informed there is no (presently available or known) reliable method or apparatus for detecting microbursts.

My analysis leads me to conclude that FIG. 1 can be used to describe a typical microburst. FIG. 1 is a cross-section of such a microburst. A region or zone Z of superheated air a distance above the ground is initially penetrated by rain. The rain evaporates at a high rate to quickly reduce the air temperature and thereby increase the density of the superheated air. The now heavy air proceeds to move downwardly at an accelerating rate until it reaches ground level where it must now spread out horizontally. The short-term nature of a microburst is explained since the rapid air fall causes a partial vacuum and thus as the air drops to the ground and is heated, it returns to reduce that partial vacuum. As additional rain penetrates the zone Z, equilibrium results and the microburst terminates. I estimate that the velocity of the falling air can approach dozens of feet per second while the diameter of the falling column may be only a few hundred feet. As a consequence, near ground level we have a velocity profile similar to an inverted mushroom with radial surface winds of up to 50 mph, so that an aircraft flying diametrically through the column would experience a 100 mph air speed change over a distance as short as one mile.

Quantifying some of the geometry of FIG. 1 may provide some insight into the microburst. FIG. 2 shows the area of the falling column (Area #1) is a circular planar area of diameter H. We define the surface of a right cylinder of radius D2, the cylinder having a length or height h2, and refer to this area as Area #2. We define a third area as a right cylinder of diameter D1 and length or height h1. Actual observation indicates that h1 can be 200 feet and we will assume a typical diameter for D1 as 1 mile (5280 feet). On this basis then, what is the area of the falling column, of diameter H? Conservation laws indicate that Area #1=Area #2=Area #3. Thus $\pi \times (H/2)^2 = \pi \times D2 \times h2 = \pi \times D1 \times h1$. Rearranging terms, we can write $H = 2\sqrt{D1 \times h1}$, or approximately 2000 feet.

The literature cited below indicates some confusion by the poorly defined use of terms such as wind shear, microburst and downburst. That literature includes: Sutton, O. G., *Micrometerology*, Chapters 1, 7, Krieger, 1977; Offi, D.C., "Wake Vortex Detection with Pulsed-Doppler Radar ASR-8 Feasibility Tests", FAA Technical Center Letter Report, Atlantic City Airport, N.J., February, 1982; Campbell, W. C., Chadwick, R. B., K. B. Earnshaw and K. P. Moran, "Low Elevation Angle Wind Measurements by FW-CW Radar", Proceedings of the 19th Conference in Radar Meteorology, American Meteorological Society, Boston, Mass. April, 1980; Skolnik, Merrill I., *Introduction to Radar Systems*, Second Edition, McGraw-Hill, 1980; "Wind Shear Microburst Focus of Weather Study", Aviation Week and Space Technology, June 14, 1982; "Wind-Alert System OK'd for 34 Airports", Daily News, Oct. 12, 1979; Covault, Craig, "Heavy Rain Danger Called Greater than Wind Shear", Aviation Week and Space Technology, Jan. 26, 1981; "NTSB Hearing on 727 Crash Expected to Focus on Weather", Aviation Week and Space Technology, Aug. 2, 1982; North, David M., "Weather Conditions Draw Focus in Pan Am Crash", Aviation Week and Space Technology, July 19, 1982; "The Wind-Shear Factor", Newsweek, July 26, 1982; "The Dulles Airport Pressure Jump Detector Array for Gust Front Detection", Bulletin American Meteorological Society, Vol. 58, No. 9, September, 1977; "The Dulles Airport AcousticMicrowave Radar Wind and Wind Shear Measuring System", Bulletin American Meteorological Society, Vol. 58, No. 9, September 1977; "Operational Application of Meteorological Doppler Radar", Bulletin American Meteorological Society, Vol. 61, No. 10, October, 1980; Fujita, T., and F. Caracena, "An Analysis of Three Weather-Related Aircraft Accidents", Bulletin American Meteorological Society, Vol. 58, No. 11, November, 1977; Haltiner, G. J., and F. L. Martin, *Dynamical and Physical Meteorology*, McGraw-Hill, 1957; Geiger, Rudolf, *Climate Near the Ground*, Harvard University Press, 1971; *Atmospheric Phenomena: Readings from Scientific American*, W. H. Freeman, 1980; Nathanson, F. E., *Radar Design Principles*, McGraw-Hill, 1969 and Anderson, Ray, "Understanding Aeolus", Cruising World, August, 1982.

It is my conclusion that one of the major problems with the microburst is its size, that is, its size may be as important, if not more important, than the severity of wind velocity. This comes about as a natural consequence of the characteristics of large airliners and the training imparted to their pilots. Firstly, during take off and landing maneuvers, the aircraft is typically purposely operated near stall speed (sometimes only 35 mph above stall speed) and the acceleration capabilities of these large craft are inadequate to cope with large air speed variations. As described in the subcommittee report cited above, the first symptom of a microburst is a relatively rapid increase in head wind. This increases the air flow across the wings of the aircraft, increasing its air speed and, if nothing else is changed, would induce the aircraft to rise above the desired flight path. In the absence of accurate knowledge of the wind shear phenomenon, the typical pilot would choose to throttle back (as they are trained to do) so as to reduce air speed to a target air speed. Almost immediately a down draft occurs (i.e. the head wind disappears) and almost immediately thereafter a strong tail wind appears. Because the pilot is now in a powered down mode, increased air speed to counteract the performance decreasing tail wind is required. However, the aircraft does not have the acceleration capabilities to cope with this rapid wind variation and an aircraft stall and subsequent crash can be expected. Based on my analysis, the invention overcomes the prior art problems by looking for a weather phenomenon having the characteristics defined above. Furthermore, it is not necessary to search vast regions of air space, rather the search can be confined to relatively localized areas. More particularly, the severity of the microburst is limited to the regions in which aircraft purposely fly at or near stall speed and at the same time are relatively close to the ground so that there is little time or space within which to recover. For example, I estimate the region of vulnerability to an aircraft to be in those regions where the aircraft is less than approximately 1200 feet high. Using a typical glide slope of about 3° from the horizontal, this region is limited to the aircraft's flight path within 4 miles of its touch down or take off point. This is the preferred region within which a search should be conducted although the search could be limited to an even smaller region, say where the aircraft is less than 300 feet in height which extends along the aircraft flight path about a mile from its touch down or take off point.

Once detected, it is conceivable that a pilot (being warned) could maneuver the aircraft safely through a microburst, particularly by not powering down when first encountering a head wind. Preferably, however, based on the short lifetime of the microburst (10-15 minutes), a microburst which is detected in the region I have defined above will result in terminating aircraft operations through the microburst. This short interruption (10-15 minutes) will provide the maximum safety.

Having defined the region within which the search will be conducted, it is now important to determine how we will detect the presence of a microburst. Relatively conventional doppler radar is capable of identifying the velocity of air in motion to the extent that the velocity is radially directed (parallel to beam propagation). The velocity profile associated with the microburst is in the form of an inverted mushroom, where air is travelling radially outward from the downwardly moving column around the entire 360°. Accordingly, if a microburst is located in the region to be searched, the radar beam will propagate diametrically through the velocity profile, at least at one particular azimuth. At this azimuth the wind velocity will be radial (parallel to beam propagation) and there will be two range cells where velocity is (or nearly is) equal in magnitude and opposite in direction. At nearby azimuths the actual wind velocity will be equal, but the component of wind velocity parallel to the beam propagation path will be smaller. Identification of that beam propagation azimuth which is associated with maximum wind velocity will serve to identify a line along which the center of the microburst lies. One cell or group of range cells along that azimuth will exhibit wind velocity in one sense, a different cell or group of range cells along the same azimuth will indicate wind velocity of equal (or near equal) velocity but opposite sense. The distance between these two groups of range cells then is the diameter of the microburst, and halfway between these two groups of range cells identifies the center of the microburst.

The inventive microburst detector then, employs a doppler radar which may be range and azimuth gated to provide wind velocity information to an intelligent processor from selected regions in space, particularly those regions in which an aircraft would be vulnerable to the microburst. The signals provided to the intelligent processor identify the component of actual wind velocity in the direction of the beam propagation path. The wind velocity components are stored for processing, preferably in an array. The intelligent processor then effects a pattern matching process based on the criteria identified above.

In one particular implementation the data is stored in a array, with each cell storing the sign and magnitude of sensed wind velocity (the component of velocity parallel to the beam propagation path). The array can be considered to have two dimensions, different ranges are identified as different rows in the array, and the other dimension corresponds to the columns of the array. There is a unique correspondence between a particular cell and a real region within the monitored volume. The microburst can be detected and located by a pattern matching operation. One particular row (range) is selected and the data stored therein are compared to the data stored in different rows (comparing cells in like columns). When a pair of rows are identified in which the stored wind velocity in at least one pair of corresponding cells in different rows is equal and opposite (to within some difference threshold), a first step in the pattern matching has been accomplished because the center of the microburst may lie in the row midway between the two selected rows and equi-distant therefrom. Since the doppler radar senses only velocity components parallel to the propagation path, we realize that a pair of cells lying on the diameter of the circle defining the microburst location will exhibit equal (and maximum) and opposite velocity. Cells on the circumference of that circle and on the perpendicular diameter will show zero velocity since, at those cells, wind velocity is perpendicular to beam propagation. This is another criteria that can be used in the pattern matching process. This criteria is not preferred for it relies on comparisons of near zero data and thus could not be expected to be particularly accurate.

An alternative to locate the center of the microburst we compare sense and magnitude of wind velocity between different cells in a common row, but preferably not the row suspected to contain the center of the microburst. Identifying pairs of cells in a common row which exhibit equal magnitude and sense of wind velocity allows us to pinpoint the center of the microburst as lying in the column midway between the selected cells which exhibit this characteristic.

Accordingly, the invention, in one embodiment, provides a microburst detector including a doppler radar transmitting along a propagation path varying in range and azimuth across a region in space including a termination of an airport runway and, an intelligent processor responsive to signals from the doppler radar, the intelligent processor including storage means for storing data representative of wind velocity components parallel to said propagation path in a predetermined order, said intelligent processor further including:

pattern matching means for searching for a specific pattern of said data for locating a center of a particular circle wherein data of equal and opposite sign are stored in a pair of cells located along one diameter of the particular circle, and means for signalling a microburst on detection of said pattern.

Once a microburst has been detected as aforesaid, its location and radial extent can be readily determined. The center is merely a point defined by the intersection of the diameter referred to above and another diameter which intersects the circle at locations where null or near null wind velocity data is stored. If we examine the data stored in the cells located radially outward of the center and on the diameter parallel to the beam path, we will find a pattern of continually increasing velocity to a maximum and then a decrease in the velocity. The distance between the center and the velocity maximum determine the radius of the microburst. By monitoring the same region as a function of time, we can detect movement of the microburst as well as its termination phase.

While the life of a microburst is, on the meteorological scale, relatively minor (10–15 minutes), on the scale of operations taking place in a suitable embodiment of an intelligent processor, the characteristics of the microburst and its movement do not occur very rapidly. My present estimate is that it will be entirely sufficient to accumulate data in a single radar sweep (for example 1 second), arrange the intelligent processor so that it need not process data in less than 60 seconds. Accordingly, new data is present only once per minute.

BRIEF DESCRIPTION OF THE DRAWINGS

The present invention will now be described in such further detail as to enable those skilled in the art to make and use the same, and that description relies on the attached drawings in which like reference characters identify identical apparatus, and in which.

DETAILED DESCRIPTION OF A PREFERRED EMBODIMENT

Figure 1:
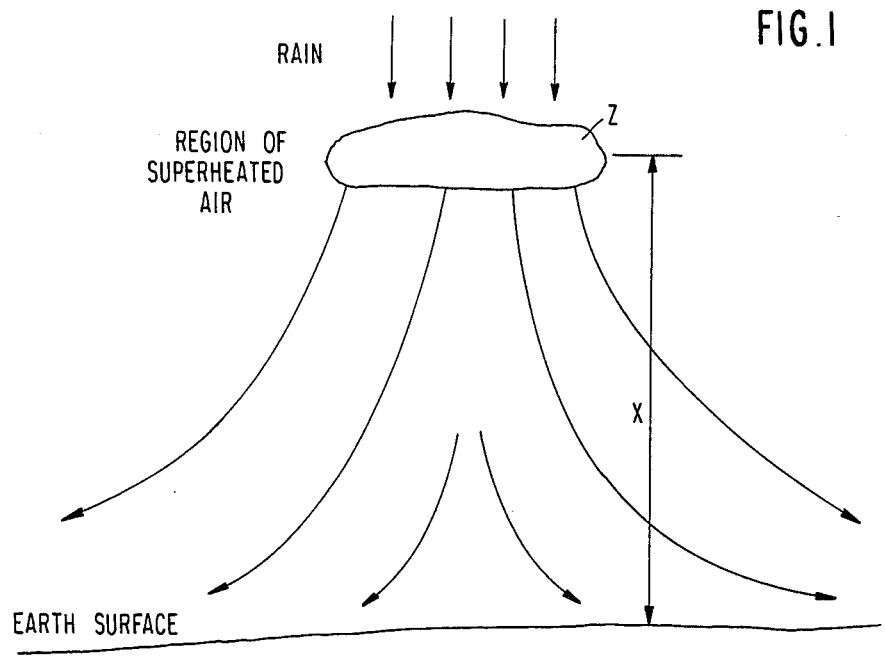
FIGS. 1 and 2 are useful in explaining the geometrical characteristics of a microburst.
Figure 2:
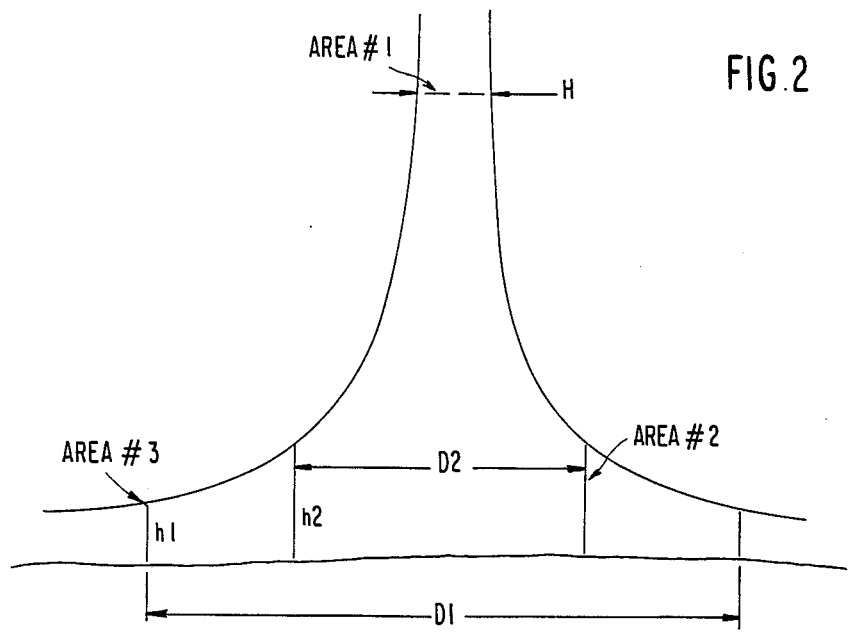
Figures 3, 4:
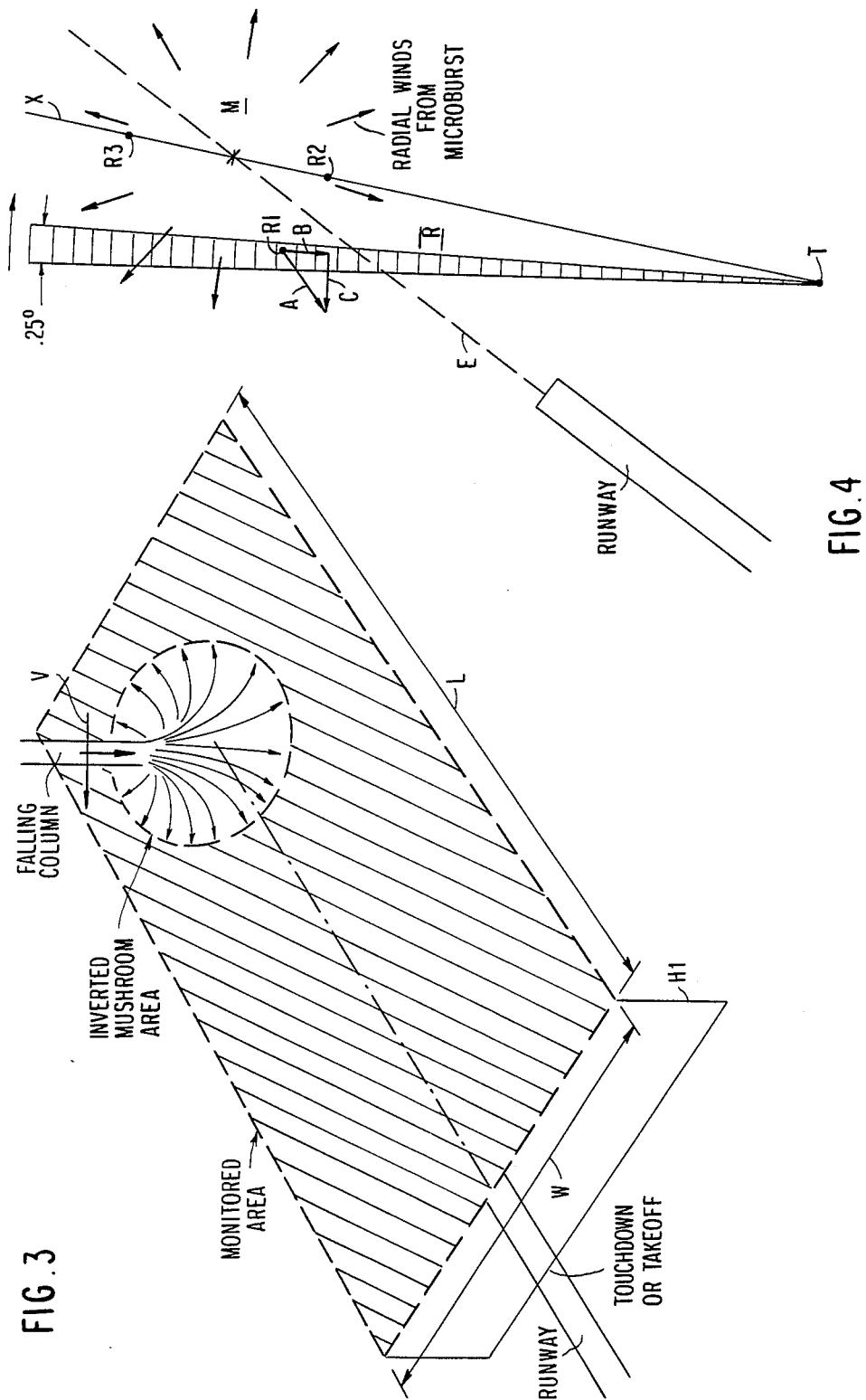
FIG. 3 is a representation illustrating what I consider to be the region in which aircraft are vulnerable to microbursts relative to the runway the aircraft is either approaching or has just left.
FIG. 4 is a plan view illustrating the runway, a doppler radar location in the microburst at an arbitrary position.

As indicated above, we desire our microburst detector to search only selected regions in space. FIG. 3 gives some idea of the volume of that region in relation to a runway such as a runway show in the figure. There is on the runway a nominal take off or touch down point, which can be used to measure the volume which is to be monitored. The volume encompasses a length L, a width W and a height H1. As indicated previously, the vulnerable region or monitored area is that area within which a typical aircraft will be within 1200 feet of the ground. Using a typical 3° glide slope, the length L of the monitored area should be on the order of four miles, the height H is clearly 1200 feet, and the width W can be selected on a number of criteria including typical aircraft approach angles, and a typical dimension of a microburst. Assuming for example that the aircraft path is parallel to the runway, then the only reason for using a width W which is larger than the air space to be occupied by the aircraft is for the purpose of early warning, the larger W, the earlier will be detected a microburst approaching the runway or runway extension. To the extent that typical aircraft paths deviate, we may wish to increase W, and if typical aircraft deviation is skewed, we will likewise skew (relative to the runway or its extension) the monitored area.

FIG. 4 is a plan view showing the runway, its extension E relative to the radar transmitter T. As is well known to those skilled in the art the radar emits pulsed electromagnetic energy in a beam, and causes that beam to rotate about the position T. The electronics associated with the radar receiver time slice's received energy so as to define range cells, such as the typical range cell R. FIG. 4 also shows a typical microburst M with horizontal winds radiating outwardly from its center throughout 360°. As was previously indicated the wind velocity reported by the doppler radar receiver will be that component of the wind velocity which is parallel to the beam propagation path. For the beam propagation path Y, wind velocity associated with range cell R1 is the vector A. FIG. 4 shows this vector resolved into a component B (parallel to the propagation path Y) and perpendicular thereto (C). Thus the radar doppler receiver will for azimuth Y and range cell R1 report a wind velocity B and of sign directed towards the transmitter T.

Figure 5:
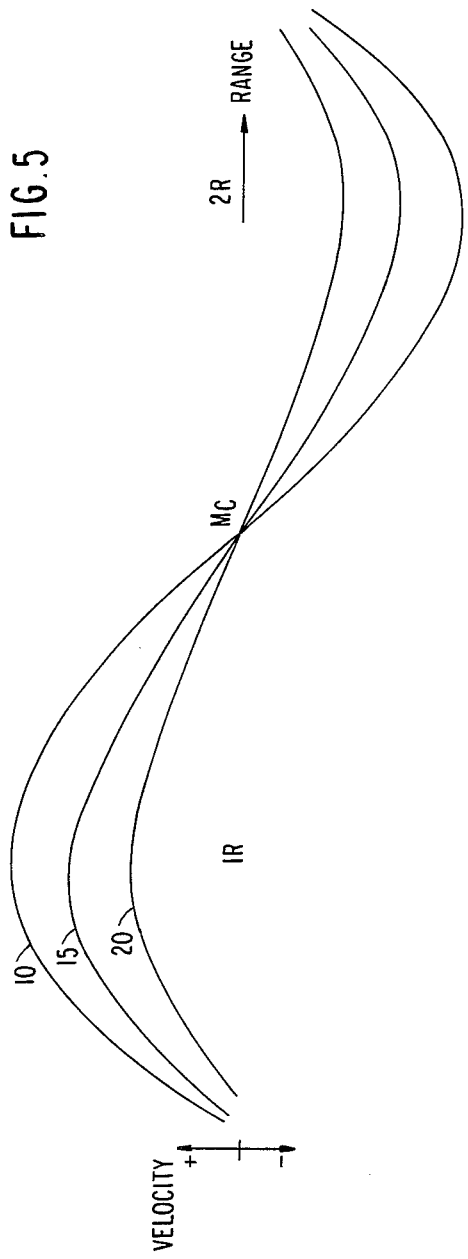
FIG. 5 is a plot of wind velocity vs. range characteristic of a microburst, at different azimuths.

At a different azimuth, X, the beam propagation path passes diametrically through the microburst M. At this particular azimuth, the wind velocity associated with range cell R2 will be equal and opposite to the wind velocity associated with the range cell R3. Somewhere along the azimuth X there will be range cells at which maximum wind velocity will be reported. These range cells will be symmetrically located about the center of the microburst M. Other azimuths (other than X) will show a similar characteristic, although the wind velocities reported by the radar receiver will be lower because at azimuths other than X, wind velocity reported by the receiver will be only that component of the wind velocity which is parallel to the beam propagation path. FIG. 5 shows three radar sensed wind velocities 10, 15 and 20 as a function of range. As shown in FIG. 5 the wind velocity in the vicinity of the center $M_c$ of the microburst is at or near zero, at a first range 1R the velocities for the three different profiles 10, 15 and 20 reach a maximum, at another range 2R the velocities are substantially equal but opposite in sense.

Figure 6:
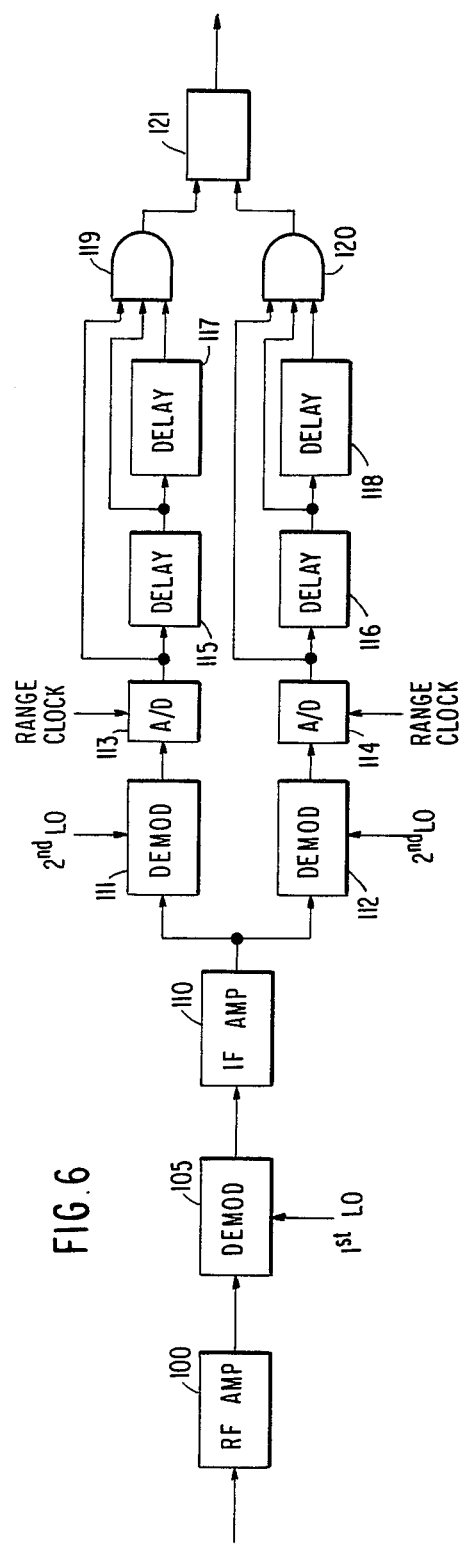
FIGS. 6 and 7 are detailed block diagrams of respectively the doppler receiver and the intelligent processor in accordance with the present invention.
Figure 7:
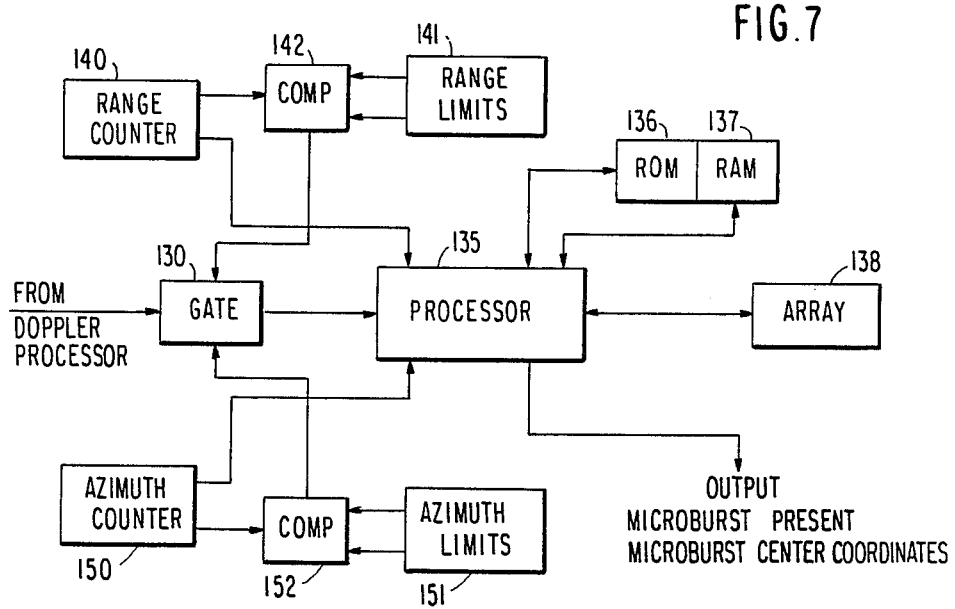

FIGS. 6 and 7 show block diagrams of a suitable radar receiver for use in accordance with the present invention. FIG. 6 shows in the main the analog signal processing, which is relatively conventional for doppler radar. More particularly, an RF amplifier 100 feeds a demodulator 105, the other input of which is provided by the first local oscillator. The output of the demodulator 105 is amplified by IF amplifier 110. The output of amplifier 110 is fed to a pair of demodulators 111 and 112, each of which are provided with a signal from a second local oscillator, although phase displaced by 90°, so that the outputs from demodulators 111 and 112 are in phase quadrature. Each of these outputs is applied to an analog-to-digital converter 113 and 114 which is clocked with a range clock. The output of each of the analog-to-digital converters 113, 114, therefore is the response at each of different range cells. These outputs are provided to delay line chains, one chain comprising delays 115, 117 and the other chain comprising delays 116, 118. Each of the these delays corresponds to a range cell. The output of one chain, the output of delays 117, 115 and the output of A/D converter 113 are applied to one gate 119. The output of the other chain, delays 116, 118 and the output of A/D converter 114 is applied to the other gate 120. The output of gates 119 and 120 are applied to the weighted summing device 121. The output of the weighted summing device 121 is, for each range cell, an indication of velocity, sense and magnitude parallel to the beam propagation path. The block diagram of FIG. 6 is one form of a conventional doppler radar receiver, and it is not essential to the invention that this particular form be used; practically any doppler receiver would be suitable.

The output of the doppler receiver of FIG. 6 is input to the intelligent processor, a block diagram of which is shown in FIG. 7. The intelligent processor includes a gate 130. Selected signals output from the receiver are gated through to the processor 135. The gate 130 is controlled by a pair of inputs, a first input from a range control including a range counter 140, a range limit selector 141 and a comparator 142. The range counter 140 is driven by the range clock (part of the receiver), and the range limits 141 are selected to define the monitored area (see FIG. 3). The range limits 141 can be fixed, or they can be selected by the processor 135 based on operator input. The other control to the gate 130 is provided by the azimuth control. This includes an azimuth counter 150, azimuth limits 151 and a comparator 152. The azimuth counter 150 is driven by the azimuth change pulses (ACP) also derived from the receiver. The azimuth limits 151 may be fixed, or like the range limits 141, selectively controlled by the processor 135 in dependence on operator input. The simple arrangement shown in FIG. 7 provides for a monitored area which is defined by a pair of radii, the angle between them defined by the azimuth limits 151, and a pair of circular arcs at different ranges determined by the range limits 141. Sharper precision, such as the rectangular volume shown in FIG. 3, can be produced by the apparatus shown in my prior U.S. Pat. No. 4,516,125.

Figure 8:
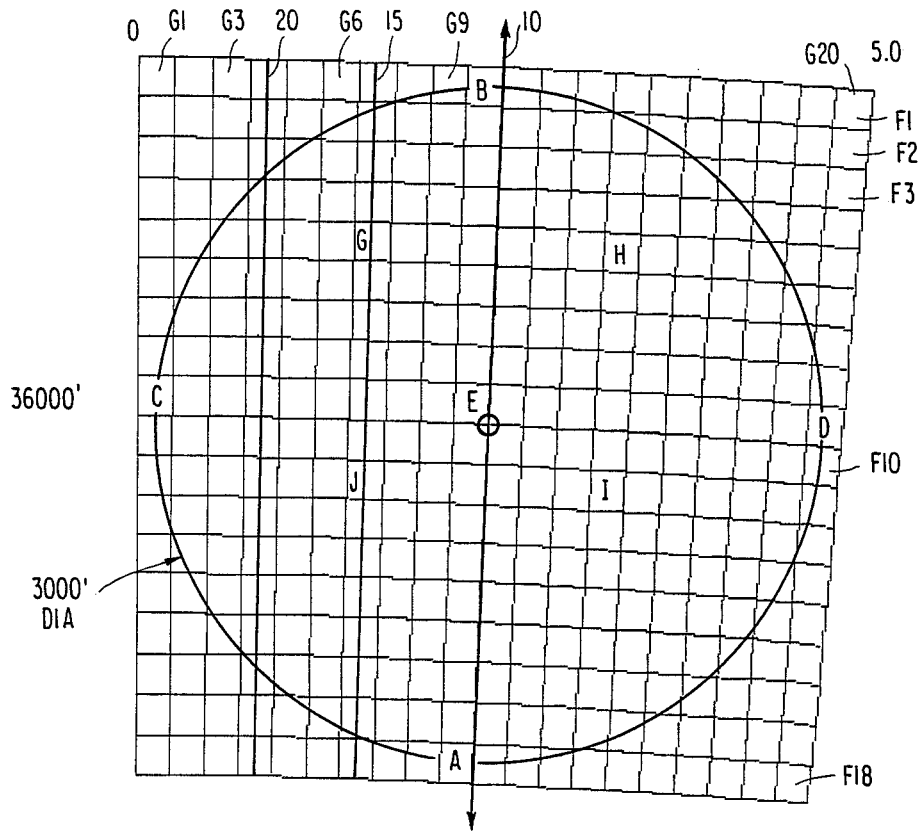
FIG. 8 is a representation of the preferred form of an array 138 (FIG. 7) on which is superimposed a circle representing a microburst.

As should be apparent to those skilled in the art, selected outputs from the receiver (particularly those returned from range/azimuth combinations lying within the monitored region) are passed to the processor 135. This particular arrangement could be modified in many ways, indeed the processor 135 could perform the gating function. Associated with the processor 135 are storage devices including ROM 136, RAM 137, including an array 138. In addition to the output from the gate 130, the processor 135 also receives inputs from the range counter 140 and the azimuth counter 150. As digital signals from the gate 130 representing wind velocity are received by the processor 135, they are selectively placed in the array 138 in dependence on the range and azimuth. FIG. 8 is a representation of the array 138 showing a plurality of cells arranged in horizontal rows and vertical columns. Each cell represents a distinct component of the monitored area. Based on a preferred length of the monitored area of approximately four miles (corresponding to about 24,000 feet), I use about 135 range cells, and thus each range cell represents about 177 feet. The perpendicular dimension of each cell is approximately 177 feet as well. Obviously, the cell size determines resolution and while the parameters reported here are preferred, they may also be widely varied. Superimposed on the grid of the array 138 is placed a circle representing a diameter of approximately 3000 feet. The center of the circle is represented at E. The circle is cut by three lines 10, 15 and 20, each representing a different azimuth. If a microburst is located in the monitored region with a center at E, and a 3000 foot diameter, then the circumference of the circle shown in FIG. 8 represents the location of maximum wind velocity, and the velocity profiles of FIG. 5 represent, in analog fashion, the data that would be stored in the range cells cut by the lines 10, 15 and 20 of FIG. 8 at the corresponding ranges.

Thus in the embodiment of FIG. 7, after the processor 135 has filled the array 138, microburst detection is accomplished by a pattern matching operation. One suitable pattern matching operation will now be described although those skilled in the art will be able to devise other pattern matching techniques after reviewing this description. The purpose of the pattern matching operation is two-fold, to determine if a microburst exists, and if one exists to locate its center and measure its diameter. Successful completion of this operation, if repeated as a function of time will not only detect the presence of a microburst and its location at any time, but also indicate its direction of motion (by the change in the center position) and probable expected lifetime (as a function of the lifetime already elapsed).

In the embodiment to be described the pattern matching also locates the cells representing the largest magnitude of wind velocity. This feature is not essential so long as two cells are identified which lie along the diameter parallel (or most nearly parallel) to the beam propagation path. The first step in this pattern matching operation is to locate the azimuth 10 and the diameter of the microburst, if one exists. What we are looking for is a pair of spaced apart range cells at a common azimuth which have stored wind velocity of substantially equal but opposite sense. This can be accomplished by picking a suitable row of cells and comparing the data in that row to the data in different rows. More particularly, for convenience we will number the columns, left to right, G1–G20 and the rows, top to bottom, F1–F18. To compare the data in one row such as F1 with the data in a different row such as F10, we merely perform the following operation (where each cell is identified by its column and row position): [G1,F1]–[G1,F10]; [G2,F1]–[G2,F10]; [G3,F1]–[G3,F10]; etc. We begin with the selected row (F1) and make this comparison either for each row pair including the row F1 or for selected row pairs including the row F1. After that operation is complete, we will repeat the operation for a different row such as F2, and so on. In the example shown in FIG. 8, after completion of the operation we will find that if the subtraction is accomplished algebraically, the result of [G10,F1]–[G10,F18] will be maximum. This identifies the range cells G10,F1 and G10,F18 as candidates indicating the potential presence of a microburst and identifying the azimuth 10 as the locus along which the center of the microburst exists. To speed up the operation, we may threshold the data so that data representing wind velocity less than a threshold is simply ignored.

In order to complete the test for the presence of a microburst, we could for example compare the data in another pair of cells which are selected as lying in rows different than F1 and F18, but equally distance spaced from the column G10 and lying within the circle. We can test for example cells G (G7,F6) and H (G14,F6). A microburst is consistent with data at these locations indicating identical or near identical wind velocity. We could also compare cells G (G7,F6) and J (G7,F12). Data in these cells which are substantially equal but opposite in sense is also consistent with a microburst. A comparison between cells J (G7,F12) and I (G14,F12), if consistent with the presence of a microburst, would indicate equal wind velocity. A similar comparison could be made between cells H (G14,F6) and I (G14,F12) and if it indicates equal and opposite wind velocity the comparison is consistent with the existence of a microburst. A suitable flow chart for this pattern matching is shown in FIGS. 9 and 10.

Figure 9:
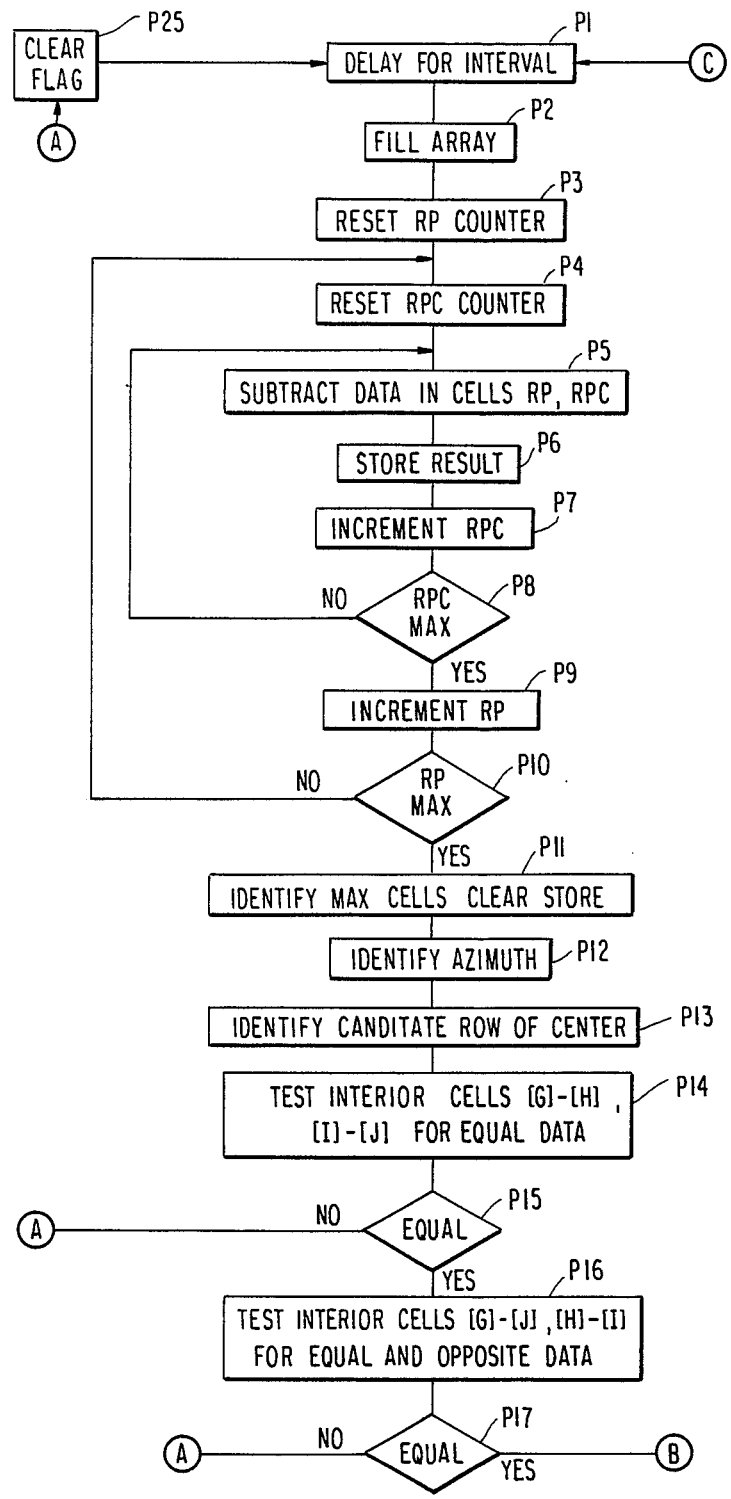
FIGS. 9 and 10 are a flow chart of one form of a pattern matching routine which can be used to identify the existence and location of a microburst in accordance with a method and apparatus of the invention.
Figure 10:
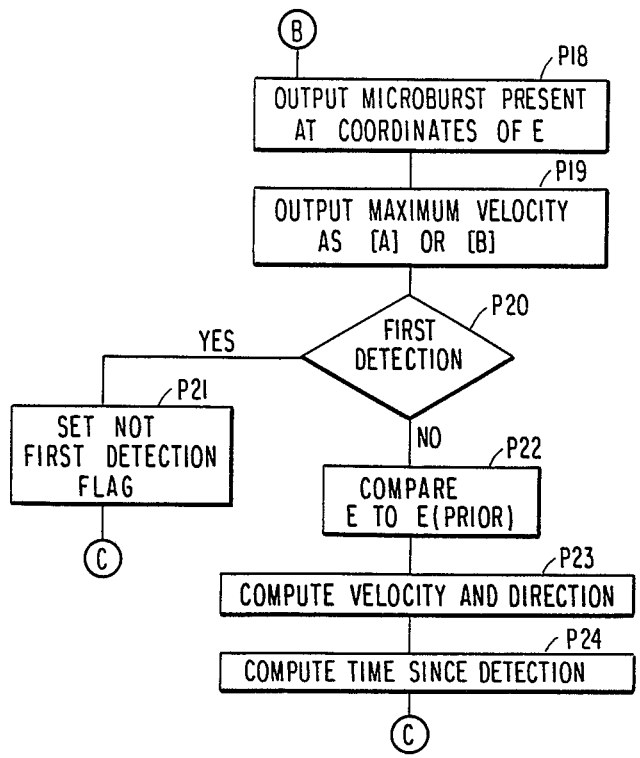

As shown in FIGS. 9 and 10 the processing is an endless loop which includes a suitable delay. This delay can be selected within wide limits although I have suggested that a one minute delay between iterations is appropriate. The delay must account for the time required for processing and the average velocity of microbursts, for during the delay our estimate for a microburst's position will be aging. Thus function P1 is such a delay. Processing employs a pair of row counters, RP and RPC. In the course of the processing the data in cells in the row identified by the counter RP is subtracted from the data in cells in the row identified by the RPC counter. In this fashion we obtain cell differences (for cells in a common column). These are stored and will later be reviewed to determine the cell pairs which provide the maximum differences. These will be used as an estimate of the location of cells A and B. We then test several other interior cells (such as G, H, I and J) and if those tests are passed, we signal the presence of a microburst and its location. By detecting the microburst's position as a function of time, we can determine its lifetime since inception, its most recent position, and its velocity and direction of motion.

Referring now to FIG. 9, after the delay P1 has expired, we fill the array 138, at function P2. Functions P3 and P4 reset our counters RP and RPC. Function P5 compares (algebraic subtraction) the data in cells identified by the contents of counters RP and RPC and in each column. Function P6 stores the result. The result will typically be a difference for each cell pair. Function P7 increments the counter RPC. Function P8 checks to see if RPC is at a maximum count. If it is not, functions P5–P7 are performed again. After a suitable number of iterations of this loop, the RPC count will be at a maximum (we have gone through the array once) and thus rather than relooping, function P9 increments the counter RP. Function P10 determines if the counter RP is at a maximum. Since this is the first increment, it would not be maximum and therefore processing proceeds back to function P4 where the counter RPC is reset. The loop of functions P5–P9 is repeated until the contents of counter RP does reach a maximum. At this point, functions P5/P6 have been repeated a sufficient number of times so that there is a stored difference from every pair of cells in each column. Function P11 examines this information and identifies that pair of cells wherein the difference is a maximum (A,B). Function P12 identifies from these two cells the azimuth 10. Function P13 identifies the candidate row of the center, e.g. row F9. Function P14 tests the interior cell pairs G,H and I,J for equal data. Function P15 branches on the result, if the data is unequal (within a reasonable threshold) then a microburst has not been identified and the processing loops back to function P25 where a flag (to be discussed) is cleared. On the other hand, if function P15 determines that the comparisons produced an equality, then function P16 tests interior cell pairs G,J and H,I for equal and opposite data. If this test has failed, processing loops back through point A as before. On the other hand, if the test is passed then we have satisfied the criteria for detecting a microburst and processing skips to point B (see FIG. 10). Function P18 is performed to output a microburst present indication as well as an indication of the coordinates of the center E. Function P19 outputs the maximum velocity associated with the microburst which can be determined from the contents of either cell A or B. Function P20 determines if this is the first microburst detection, this is determined by checking a not first detection flag. If that flag is not set, then the exit is to function P21 where the flag is set. Processing loops back to function P1 (without traversing function P25, so that the flag remains set). On the other hand, if this is not the first detection, then the exit is to function P22 where we compare the coordinates of the center (E) with the previous coordinates of the center, E (prior). This displacement (if any) is used along with the time between the separate detections in function P23 to compute the velocity and direction of the microburst. Function P24 computes the time since the microburst was first detected. This information can then be output via display to an operator.

It should be apparent that other and different processes can be employed to test the hypothesis of microburst presence. In order to reduce the effect of noise on this processing, preferably function P2, in filling the array 138, thresholds the data so that low velocity data is eliminated and written into the array as zero velocity data.

It should be emphasized that while the circle imposed in FIG. 8 represents the limits or maximum velocity locus for the microburst, the data will not reflect this circle. That is, the data contents at cell B or A will be much higher than the data contents at cells C and D. At cell E the velocity should be near zero or null. The actual wind velocity at the locations corresponding to cells C and D, while in magnitude equal to the velocity at regions corresponding to cells A and B, is in such a direction (perpendicular to the beam propagation) that the velocity is not detected by the radar and thus these cells will also store near zero or null data. In fact, travelling from cell B or A along the circumference of the circle, toward the cell C or D, the data stored in the corresponding cells should show a sinusoidal variation from a maximum towards zero.

Figure 11:
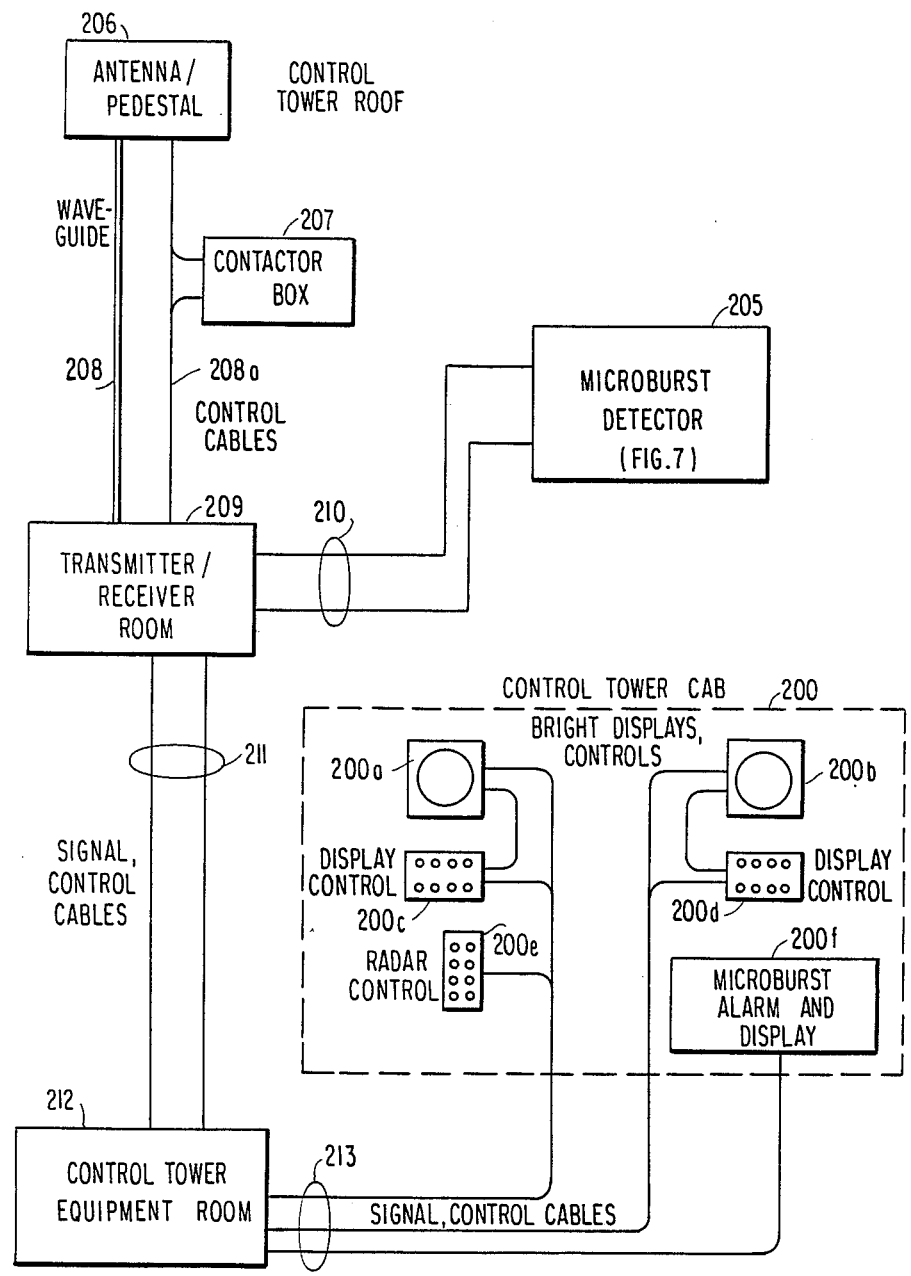
FIG. 11 is a block diagram of a preferred embodiment of the invention in which the microburst detection function is performed by auxiliary apparatus associated with the conventional ASDE radar.

Although the microburst detector of the invention as thus far described can be a stand alone or dedicated radar system and associated intelligent processor, in a preferred embodiment, existing ASDE equipment is employed in the manner shown in FIG. 11. More particularly, a conventional ASDE includes a control tower 200 including a plurality of displays 200a and 200b, and controls 200c and 200d. This equipment is coupled via conductors 213 to a control tower equipment room 212 which is coupled over conductors 211 to a transmitter/receiver room 209. The transmitter/receiver room is coupled via a waveguide 208 and additional conductors 208a to an antenna pedestal 206, the conductors 208a are coupled through a contactor box 207 (to provide for sliding contact between the stationary transmitter/receiver room 209 and the rotating antenna pedestal 206). The inventive microburst detector is added in the form of a microburst detector 205 (corresponding to the apparatus shown in FIG. 7) which is coupled via conductors 210 through the transmitter/receiver room 209 to a microburst alarm and display 200e. The microburst alarm and display 200e may include any suitable alphanumeric display for copying the information produced in accordance with the flow chart of FIGS. 9 and 10. The microburst alarm and display 200e may also include provision for operator input to select one or more predetermined monitored regions.

Figure 12:
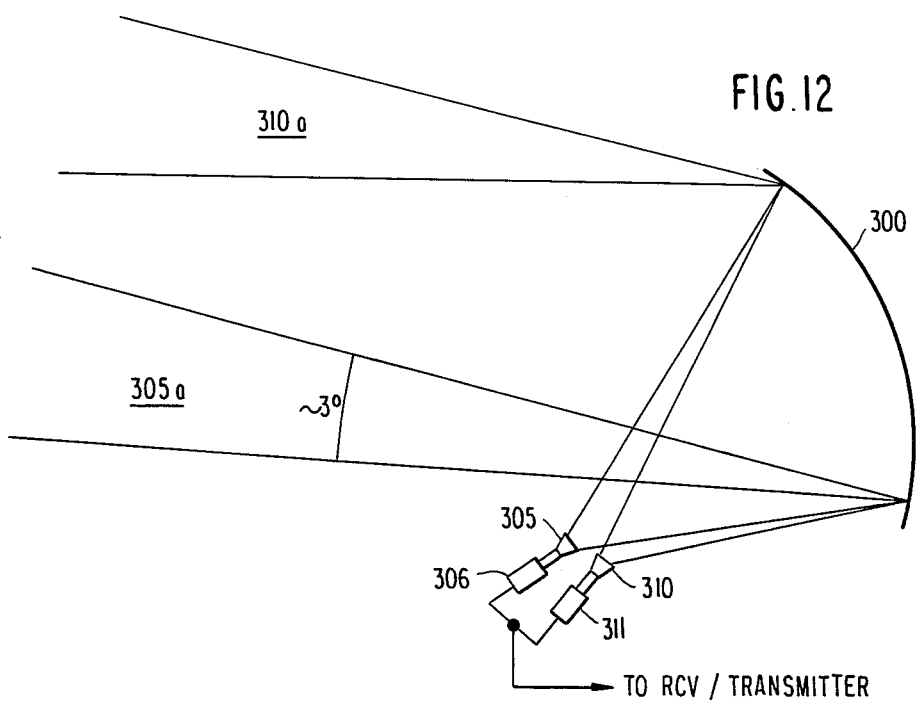
FIG. 12 illustrates a preferred embodiment of the radar antenna modified, for effecting both a conventional Airport Surface Detection Equipment ASDE function and the inventive microburst detection function.

In accordance with this preferred embodiment of the invention, the fields of view of the conventional ASDE function and the microburst detector are not necessarily identical. More particularly, the ASDE function requires object detection in an essentially horizontal plane at or very slightly above ground level. On the other hand, the microburst detection function requires monitoring a volume of airspace whose center line follows a preferred glide slope, e.g. approximately 3° to the horizontal. To achieve the benefits of integrating the microburst detection function with the conventional ASDE function, as shown in FIG. 11, preferably the antenna itself is modified as shown in FIG. 12. FIG. 12 illustrates a radar antenna which includes a parabolic reflector 300 associated with an energy emitting/receiving horn 305. The combination of horn/reflector physically rotates about a vertical axis. The horn 305 is mounted so that energy transmitted therefrom and reflected by the reflector 300 travels in an essentially horizontal plane in a beam 305a to effect the ASDE function. As shown in FIG. 12, an additional microburst horn 310 is added to the antenna pitched at a different angle than the horn 305. The angle for the horn 310 is selected so that energy emitted from the horn 310, when reflected by the reflector 305, propagates in a beam 310a whose center line forms an angle with the horizontal of approximately 3°. To provide for signal separation between the ASDE signal returns and the microburst signal returns, the transmitter is skipped in frequency and horn 305 is associated with a bandpass filter 306 which has a pass band different than the pass band of a bandpass filter 311 associated with the horn 310. In this fashion, signals returned to the transmitter/receiver room 209 can be separated in frequency and directed to an ASDE receiver and/or the microburst receiver. It should be apparent that the application of these principles is not necessary to practicing the invention, although from an economy standpoint the structure of FIG. 12 provides significant advantages.

The table below compares, on the basis of ten different parameters, the characteristics of the ASDE-3 radar system available from the assignee of this application to those considered optimum for a microburst detector.

| Parameter | ASDE-3 | Optimum Microburst Detector |
| --- | --- | --- |
| Range | 0.1–3 mi. | 6 mi. |
| Elevation Coverage | 0–31° | Up to 3° above horizontal |
| Azimuth Coverage | 360° | 360° |
| Beam Width | 0.25° | 0.25° |
| Range Resolution | 18 ft. | 100 ft. |
| Rotation Rate | 60 rpm | 6 rpm |
| Doppler Velocity Range | 15–150 mph | 10–100 mph |
| Frequency | 15.7–16.7 GHz | 15 GHz |
| PRF | 20 kHz | 10 kHz |
| Sensitivity | −92 dB | −92 dB |

At the outset it should be emphasized that the parameters identified for optimum microburst detection can be varied widely. To the extent that the characteristics of the optimum microburst detector are similar or the same as the ASDE-3, of course for the preferred embodiment no special effort is required. By using the second feed horn 305 (FIG. 12) radiating a second signal at a reduced PRF and a longer duration provides us with the optimum parameters for range, elevation coverage, range resolution, Doppler velocity range and PRF. In order to achieve the desired antenna rotation rate and the necessary sensitivity, we raise the average radiated power used at the second frequency by increasing the duration of a pulse and use a high quality, low noise amplifier for the microburst receiver. The advantage of using the lower rotation rate for the microburst detector is increased Doppler resolution. Thus if we employ the ASDE-3 60 rpm in lieu of the optimum 6 rpm, we lose Doppler resolution because of the reduced dwell time. However, the main penalty is the loss of definition of microbursts carrying low wind velocities. Because these particular microbursts (carrying low wind velocities) are relatively less dangerous than the microburst of higher wind velocity, the use of the lower rotation rate is considered optional.

Alternatively, the beam can be opened so that a single beam from a single horn covers both the required ASDE volume as well as the monitored region for microburst detection.

I claim:

1. A microburst detector comprising a doppler radar detector propagating electromagnetic energy along a propagation path sweeping in range and azimuth across a region in space including at least one end of an airport runway, and an intelligent processor responsive to signals from said doppler radar, said intelligent processor including storage means for storing a representation of an array of cells located in rows and columns storing data representative of wind velocity components parallel to said propagation path, said intelligent processor performing a pattern matching function for searching for a specific pattern of data within said cells of the array for locating a center of a particular circle wherein data of equal and opposite signs are stored in a pair of cells located along one diameter of the particular circle and null or near null data are stored at another pair of cells along a perpendicular diameter of said particular circle, and means for signalling a microburst on detection of said pattern.

2. The microburst detector of claim 1 which includes gating means for gating range and azimuth signals from said doppler radar, said gating means connected between said doppler radar and said intelligent processor so that signals passed to said intelligent processor define a region of vulnerability for aircraft to microbursts.

3. The microburst detector of claim 2 in which said gating means includes limiting means for controlling said gating means to gate signals to said intelligent processor selected from a region along an aircraft flight path to or from said runaway for a distance less than approximately four miles.

4. The microburst detector of claim 2 in which said gating means includes limiting means for controlling said gating means to gate signals to said intelligent processor selected from a region along an aircraft flight path to or from said runaway for a distance less that approximately one mile.

5. The microburst detector of claim 2 in which said gating means includes limiting means for controlling said gating means to gate signals to said intelligent processor selected from a region along an aircraft flight path which is less than approximately 1200 feet in altitude.

6. The microburst detector of claim 2 in which said gating means includes limiting means for controlling said gating means to gate signals to said intelligent processor selected from a region along an aircraft flight path which is less than approximately 300 feet in altitude.

7. The microburst detector of claim 1 in which said intelligent processor comprises means for performing performs a timing function to initiate execution of said pattern matching on a timed basis in which each execution of said pattern matching is initiated no more often than about once per minute.

8. The microburst detector of claim 1 in which said doppler radar detector includes:

a rotating reflector, a first horn for transmitting pulsed RF energy to be reflected by said reflector for sweeping in range and azimuth, a second horn for transmitting pulsed RF energy to be reflected by said reflector for sweeping in range and azimtuh, and means for mounting said first and second horns to propagate energy from said first horn at an angle to horizontal and to propagate energy from said second horn in a generally horizontal direction.

9. The microburst detector of claim 1 in which said doppler radar detector includes a rotating reflector, and an ASDE radar detector associated with said rotating reflector.

10. A method of microburst detection comprising the steps of:

(a) selecting a region in space for monitoring within which aircraft are vulnerable to abrupt changes in wind velocity vectors, (b) providing a doppler radar and employing said doppler radar for detecting wind speed vectors, or at least components of wind speed vectors parallel to a propagation path defined by said doppler radar, (c) storing said sensed wind speed vectors in a read/write memory using a plurality of memory locations so that there is a one-to-one correspondence between different memory locations and different portions of said monitored region, and (d) comparing said stored, sensed wind speed vectors with a predetermined pattern so as to detect any correspondence between said predetermined pattern and said stored, sensed wind speed vectors.

11. The method of claim 10 which includes the further steps executed in the event that said method determines a correspondence between said predetermined pattern and said stored, sensed wind velocity vectors, of:

(i) deriving a geogrpahical coordinate determined in part by said predetermined pattern and in part by said stored, sensed wind velocity vectors.

12. The method of claim 10 in which said selecting step comprises selecting a region which is located relative to an airport runway and which extends for about five miles from a nominal take off or landing point on said runway.

13. The method of claim 10 in which said selecting step comprises selecting a region which is located relative to an airport runway and which extends for about one mile from a nominal take off or landing point on said runway.

14. The method of claim 10 in which said selecting step comprises selecting a region which is located relative to an airport runway and extends in altitude up to about 1200 feet.

15. The method of claim 10 in which said selecting step comprises selecting a region which is located relative to an airport runway and extends in altitude up to about 300 feet.

16. The method of claim 10 in which said storing step includes the step of ordering said sensed wind speed vectors in a multi-cell array with plural rows and columns wherein there are about 150 or less cells in each column.

17. The method of claim 10 in which said storing step includes the step of ordering said wind speed vectors in a multi-cell array with plural rows and columns wherein each cell represents a portion of said monitored region, each cell representing less than about 200 feet in range.

* * * * *